(12) United States Patent
Gallagher et al.

(10) Patent No.: US 8,161,495 B2
(45) Date of Patent: *Apr. 17, 2012

(54) PARAMETERS PASSING OF DATA STRUCTURES WHERE API AND CORRESPONDING STORED PROCEDURE ARE DIFFERENT VERSIONS/RELEASES

(75) Inventors: Edward Joseph Gallagher, San Jose, CA (US); Mang-Rong Ho, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/117,709

(22) Filed: May 8, 2008

(65) Prior Publication Data

US 2008/0222217 A1 Sep. 11, 2008

Related U.S. Application Data

(63) Continuation of application No. 10/759,661, filed on Jan. 16, 2004, now Pat. No. 7,467,386.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................... 719/313; 719/320; 719/328

(58) Field of Classification Search .............. 719/313, 719/316, 328; 707/705
See application file for complete search history.

(56) References Cited

U.S. PATENT DOCUMENTS

| | | |
|---|---|---|
| 4,751,740 A | 6/1988 | Wright |
| 4,969,091 A | 11/1990 | Muller |
| 4,992,971 A | 2/1991 | Hayashi |
| 5,579,509 A | 11/1996 | Furtney et al. |
| 5,615,337 A | 3/1997 | Zimowski et al. |
| 5,632,015 A | 5/1997 | Zimowski et al. |
| 5,644,768 A | 7/1997 | Periwal et al. |
| 5,649,200 A | 7/1997 | Leblang et al. |
| 5,742,810 A | 4/1998 | Ng et al. |
| 5,774,719 A | 6/1998 | Bowen |

(Continued)

FOREIGN PATENT DOCUMENTS

WO 9922362 A1 5/1999

OTHER PUBLICATIONS

IBM Search Report—Diclosure No. SVL8-2003-0001; Attorney: Richard Goldman; Searcher: Tin D. Nguyen: Date: Apr. 4, 2003; Title: Parameter Passing of Data Structures Where API and Corresponding Stored Procedure Are Different Versions/Releases; 10 pages.

(Continued)

*Primary Examiner* — Diem Cao
(74) *Attorney, Agent, or Firm* — Patterson & Sheridan, LLP

(57) ABSTRACT

A system and computer program product for passing parameters of data structures where an API and corresponding stored procedures are at different version/release levels is provided. A received data structure is parsed for a version identifier of a caller. The parsed version identifier is compared to a stored procedure version identifier and a determination is made with regards to a data structure compatibility or a data structure incompatibility. If a data structure compatibility is determined, all received data structure elements are parsed. If, however, a data structure incompatibility is determined, only data structure elements known to both the caller and the stored procedures are parsed.

18 Claims, 2 Drawing Sheets

U.S. PATENT DOCUMENTS

| | | | |
|---|---|---|---|
| 5,778,398 | A | 7/1998 | Nagashima et al. |
| 5,799,310 | A | 8/1998 | Anderson et al. |
| 5,819,252 | A | 10/1998 | Benson et al. |
| 5,862,378 | A | 1/1999 | Wang et al. |
| 5,875,332 | A | 2/1999 | Wang et al. |
| 5,892,902 | A | 4/1999 | Clark |
| 5,926,636 | A | 7/1999 | Lam et al. |
| 5,940,616 | A | 8/1999 | Wang |
| 5,950,209 | A | 9/1999 | Carrier, III et al. |
| 6,012,067 | A | 1/2000 | Sarkar |
| 6,016,394 | A | 1/2000 | Walker |
| 6,047,291 | A | 4/2000 | Anderson et al. |
| 6,055,637 | A | 4/2000 | Hudson |
| 6,063,133 | A | 5/2000 | Li et al. |
| 6,065,117 | A | 5/2000 | White |
| 6,067,414 | A | 5/2000 | Wang et al. |
| 6,073,168 | A | 6/2000 | Mighdoll et al. |
| 6,088,524 | A | 7/2000 | Levy et al. |
| 6,104,393 | A | 8/2000 | Santos-Gomez |
| 6,128,621 | A | 10/2000 | Weisz |
| 6,148,342 | A | 11/2000 | Ho |
| 6,161,182 | A | 12/2000 | Nadooshan |
| 6,167,405 | A | 12/2000 | Rosensteel, Jr. et al. |
| 6,173,400 | B1 | 1/2001 | Perlman et al. |
| 6,219,826 | B1 | 4/2001 | De Pauw et al. |
| 6,233,586 | B1 | 5/2001 | Chang et al. |
| 6,249,822 | B1 | 6/2001 | Kays et al. |
| 6,263,313 | B1 | 7/2001 | Milsted et al. |
| 6,263,342 | B1 | 7/2001 | Chang et al. |
| 6,272,488 | B1 | 8/2001 | Chang et al. |
| 6,279,111 | B1 | 8/2001 | Jensenworth et al. |
| 6,282,649 | B1 | 8/2001 | Lambert et al. |
| 6,289,344 | B1 | 9/2001 | Braia et al. |
| 6,289,458 | B1 | 9/2001 | Garg et al. |
| 6,292,936 | B1 | 9/2001 | Wang |
| 6,308,274 | B1 | 10/2001 | Swift |
| 6,314,449 | B1 | 11/2001 | Gallagher et al. |
| 6,327,629 | B1 | 12/2001 | Wang et al. |
| 6,338,056 | B1 | 1/2002 | Dessloch et al. |
| 6,339,777 | B1 | 1/2002 | Attaluri et al. |
| 6,343,286 | B1 | 1/2002 | Lee et al. |
| 6,385,768 | B1 | 5/2002 | Ziebell |
| 6,460,052 | B1 | 10/2002 | Thomas et al. |
| 6,519,767 | B1 | 2/2003 | Carter et al. |
| 6,751,798 | B1 | 6/2004 | Schofield |
| 6,751,799 | B2 | 6/2004 | Kays et al. |
| 6,845,392 | B2 | 1/2005 | Koontz et al. |
| 6,971,093 | B1 | 11/2005 | Spring |
| 7,467,386 | B2 | 12/2008 | Gallagher et al. |
| 2001/0002486 | A1 | 5/2001 | Kocher et al. |
| 2001/0008015 | A1 | 7/2001 | Vu et al. |
| 2001/0019614 | A1 | 9/2001 | Madoukh |
| 2002/0038340 | A1 | 3/2002 | Whipple et al. |
| 2002/0059404 | A1 | 5/2002 | Schaaf et al. |
| 2002/0183957 | A1 | 12/2002 | Croix et al. |
| 2003/0014561 | A1 | 1/2003 | Cooper |
| 2003/0018830 | A1 | 1/2003 | Chen et al. |
| 2003/0200256 | A1 | 10/2003 | Hu et al. |

OTHER PUBLICATIONS

EDA Server 4.21 Release Notes for NT & UNIX; 7 Pages, before Jan. 16, 2004.

API Programming in the New World of Oracle Repository 6.5—Sandra Muller, ODTUG '99; Custom Development Center of Excellence, Oracle Corporation; 10 Pages.

Migrating Designer API Programs to Oracle Repository 6i—Sandra Muller; ODTUG 2000, iDevelopment Center of Excellence, Oracle Corporation; 10 Pages.

Jeonghee et al., Visualization of Path Expressions in a Visual Object-Oriented Database Query Language, 2 pages, PD: 1999.

Chien et al., Design of a New Indexing Organization for a Class-Aggregation Hierarchy in Object-Oriented Database, Journal of Information Science and Engineering 15, 1999, pp. 217-241, Taiwan.

Jorn et al., Modeling Hierarchical and recursive Structures Using Parametric PetriNets, Computer Engineering and Networks Laboratory, Swiss Federal Institute of Technology Zurich, pp. 445-452, PD:1998.

Kawaguchi et al., Implementing Incremental View Maintenance in Nested Data Models, Database Programming Languages, 6th International Workshop, DBPL-6, Aug. 18-20, 1997, Proceedings, pp. 203-221.

Li, Tian-Zhu, Normalization of Nested Structure for Complex Objects, in Chinese, Journal of Software, vol. 9, No. 5, p. 390-396, May 1998, (With English Abstract).

PARAMETERS PASSING OF DATA STRUCTURES WHERE API AND CORRESPONDING STORED PROCEDURE ARE DIFFERENT VERSIONS/RELEASES

CROSS REFERENCE TO RELATED APPLICATION

This application is related to co-pending U.S. patent application Ser. No. 10/128,260 titled "Method and Apparatus of Parameter Passing of Structured Data for Stored Procedures in a Content Management System," which is assigned to the same assignee as the present application.

BACKGROUND OF THE INVENTION

1. Field of the Invention

The present invention is directed to improvements in computing systems and in particular to improvements in operability between application programming interfaces (APIs) and stored procedures interacting with the APIs when software upgrades or modifications are made to either one or both of the API and/or stored procedures.

2. Description of the Prior Art

Stored procedures are collections of pre-defined procedural code that are used to perform one or more tasks such as, for example, to access databases. There are a number of benefits in using stored procedures, including function encapsulation, performance enhancement, client-server processing, and security. Generally, a user explicitly invokes stored procedures in an interactive environment, but such procedures can also be invoked by other programs.

In today's software systems, an application may rely one or more of the stored procedures for various services. An application interfaces with the stored procedures or other applications through an application program interface (API). Such application integration allows an application to provide services without having to include the programming and data necessary to provide the services itself.

For example, a content management system (CMS) may rely on a database application for maintaining large amounts of information such as binary large objects (BLOBs) and character large objects (CLOBs). Stored procedures are utilized by the CMS to efficiently communicate with a database management system (DBMS). The CMS communicates with the stored procedures via a set of APIs in order to access the database information. The APIs are typically built in their own dynamic link library (DLL). The CMS may load the provided DLL and use the appropriate APIs for maintaining the BLOBs, CLOBs and other information stored in the database.

Software is typically upgraded periodically to include new or improved features. In the CMS example, the CMS and stored procedures may be independently updated in scheduled releases of new versions or maintenance levels. Each new update or release may include changes to the respective APIs, and the updates may be sent directly to a plurality of users. One problem that can result is that the updated APIs may not be inter-compatible between the CMS and the stored procedures when the CMS and stored procedures are at a different version or level with respect to each other. Such incompatibility may cause the CMS or the stored procedures to function incorrectly or not to function at all. For example, a stored procedure may only handle primitive data types such as integer, long, BLOB, and CLOB in the parameter passing portion of its interface. The stored procedure typically does not handle structured data of variable length such as, for example, an array of integers, an array of character strings or an array of mixed data types in the parameter passing of its interface.

To illustrate the problem further, in Content Manager Version 8 Release 1, an IBM product, this problem was solved with a pair of parameters (BLOB and CLOB), where the BLOB. contained numeric values representing the:

data element identifier,
data element type (i.e., small integer, integer, character),
data element length, and
data element value (for numeric data elements only).

The CLOB contained the data element values of character elements. Common routines are invoked by both of the APIs and respective stored procedures to build and parse the BLOB/CLOB pair.

However, with a second release of Content Manager Version 8 (V8.2), it was necessary to add data elements to data structures being passed in BLOB/CLOB pairs. A problem is encountered because many customers can be running environments where APIs are at a different version/release levels than their stored procedures (e.g., the APIs are at level V8.1 and the stored procedures are at V8.2 or higher, and vice versa). There are two scenarios which present two distinct problems. In the first scenario, the APIs are at a lower version/release level than the stored procedures. In this first scenario, the stored procedures expect additional data elements at the end of a data structure, and attempt to parse them, but they are not there because the V8.1 APIs do not pass them, not having any knowledge of them.

In the second scenario, the APIs are at a higher version/release level than the stored procedures. In this scenario, the APIs pass additional data elements, elements of which the stored procedures have no knowledge. Both scenarios result in a parsing error according to the current method of building/parsing BLOB/CLOB pairs. This presents a continuing problem for future releases as elements are appended to data structures.

It is therefore desirable to provide an improved method and means of passing parameters for data structures where the API and the respective stored procedures are at different version or release levels.

BRIEF SUMMARY OF THE INVENTION

In accordance with the present invention, there is provided a method of parameter passing of data structures where an API and corresponding stored procedures are at different version/release levels. The method includes receiving a data structure comprising data structure elements from a caller and parsing the data structure for a version identifier. The parsed version identifier is compared to a stored procedure version identifier. If the comparison is indicative of a data structure compatibility between the calling program and the stored procedures, all received data structure elements are parsed. If the comparison is indicative of a data structure incompatibility between the calling program and the stored procedures, only data structure elements known to both of the calling program and the stored procedures are parsed.

In accordance with another aspect of the present invention, there is provided a system for passing parameters of data structures where an API and corresponding stored procedures are at different version/release levels. A means is provided for receiving a data structure comprising data structure elements from a calling program and parsing the data structure for a version identifier. A comparison means compares the parsed version identifier to a stored procedure version identifier. If the comparison means determines a data structure compatibility between the calling program and the stored procedures, a parsing means parses all received data structure elements. If, however, the comparison means determines a data structure incompatibility between the calling program and the stored procedures, the parsing means parses only data structure elements known to both of the calling program and the stored procedures.

In accordance with still another aspect of the present invention, there is provided a computer program product having means contents for passing parameters of data structures where an API and corresponding stored procedures are at different version/release levels. Program code is provided for receiving a data structure comprising data structure elements from a calling program and parsing the data structure for a version identifier. Other program code compares the parsed version identifier to a stored procedure version identifier. If the comparison program code determines a data structure compatibility between the calling program and the stored procedures, parsing program code parses all received data structure elements. If, however, the comparison program code determines a data structure incompatibility between the calling program and the stored procedures, the parsing program code parses only data structure elements known to both of the calling program and the stored procedures.

One advantage obtained from the present invention is the elimination of parsing errors when a version/release level of a set of APIs is different than the version/release level of a corresponding set of stored procedures.

Another advantage obtained from the present invention is the reduction in computer system program maintenance necessary when upgrading with a set of APIs or a set of stored procedures.

Other advantages of the subject method and system will become apparent to those skilled in the art upon a reading and understanding of this specification.

BRIEF DESCRIPTION OF THE DRAWINGS

The invention may take physical form in certain parts and steps and arrangements of parts and steps, the embodiments of which will be described in detail in this specification and illustrated in the accompanying drawings hereof and wherein.

DETAILED DESCRIPTION OF THE INVENTION

Reference will now be made in detail to an embodiment of the present invention, examples of which are illustrated in the accompanying drawings. The detailed description which follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general purpose machines may be used with programs in accordance with the teachings herein, or it may prove more convenient to construct more specialized apparatus to perform the required method steps.

However, one of ordinary skill in the art will recognize that there exists a variety of platforms and languages for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a solid understanding of content management systems, application programming interfaces, stored procedures, and methods of accessing and storing items managed by a content management system. It being recognized that such practitioners do not require specific details of the software, but rather find data structure descriptions and process descriptions more desirable (due to the variety of suitable hardware and software platforms), such specifics are not discussed to avoid obscuring the invention.

Figure 1:
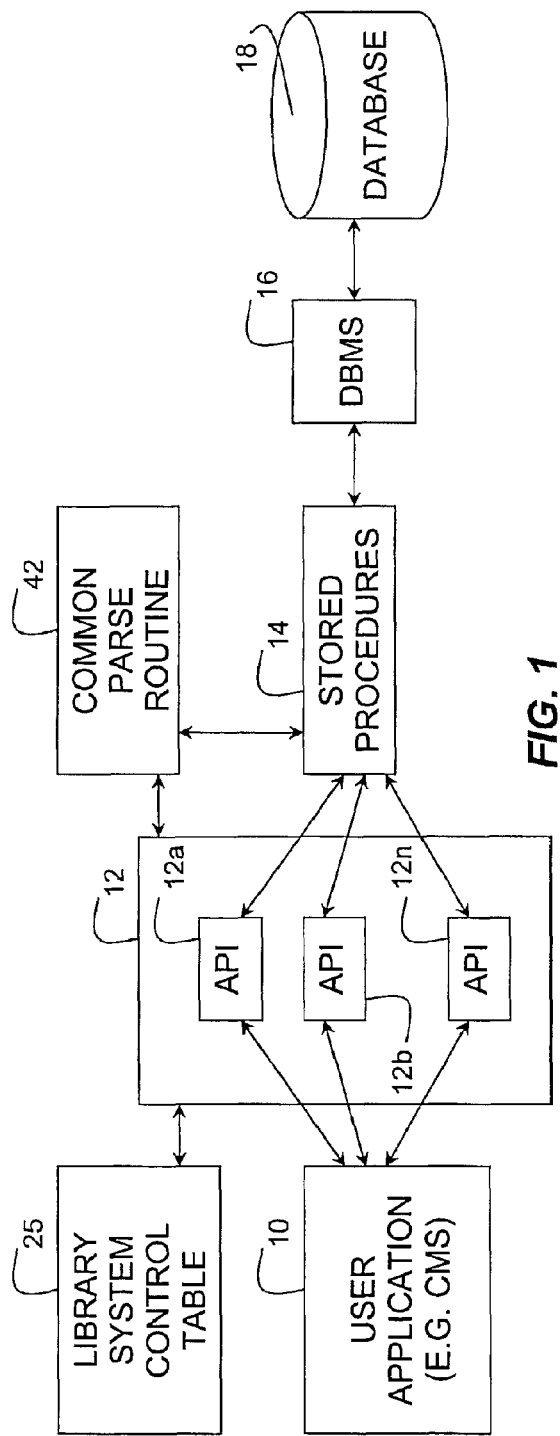
FIG. 1 is a block diagram of an exemplary environment suitable for practicing aspects of the present invention.

FIG. 1 is a block diagram that illustrates an exemplary environment suitable for practicing concepts of the present invention. A user application 10, such as a CMS for example, utilizes APIs 12 for communicating with stored procedures 14. The stored procedures 14 and the APIs 12 may be on the same computer system or may be on separate systems, in communication via a network connection (not shown). Concepts of the present invention are not limited in scope to a particular type of system, and the present invention may be realized on systems ranging from a single computer to a distributed system operating over a plurality of network connections. The stored procedures 14 are typically in communication with a DBMS 16 for accessing a database 18 where managed content is maintained.

Figure 2:
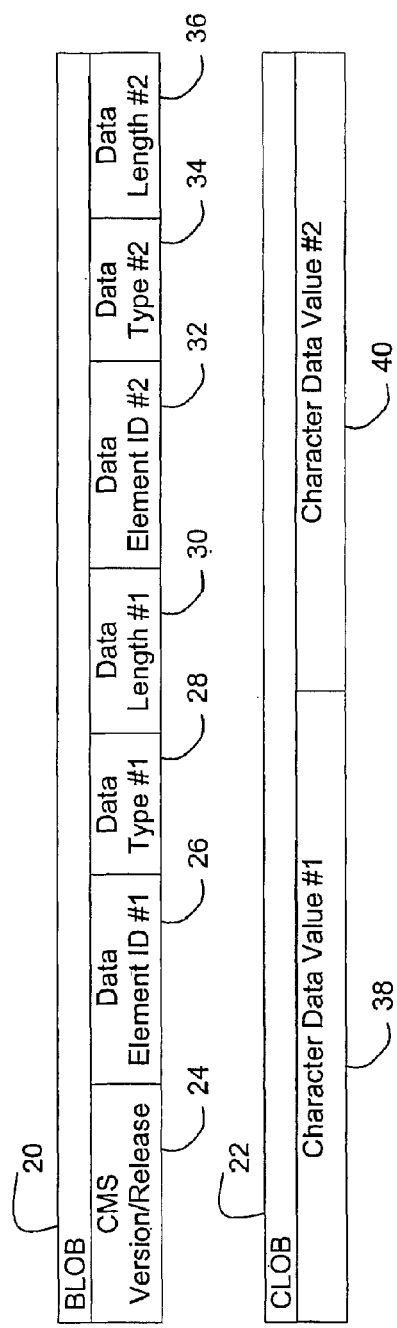
FIG. 2 is an illustration of an exemplary BLOB/CLOB pair suitable for practicing aspects of the present invention.

With reference now to FIG. 2, and continuing reference to FIG. 1, in the embodiment shown, the APIs 12 are used by the CMS 10 to send and receive BLOBs 20 and CLOBs 22 to and from the stored procedures 14 for maintaining information in the database 18 via the DBMS 16. A version/release identifier 24 of the API 12 is placed at the start of each BLOB/CLOB pair 20/22. The stored procedures 14 first parse the version/release identifier 24 placed at the start of each BLOB/CLOB pair, and then take the appropriate action to parse only what is expected for that version/release of the API 12, in other words, it parses only what is known to the API. Likewise, when one of the APIs 12 is parsing a BLOB/CLOB pair 20/22 which is returned from one of the stored procedures 14, it checks a Library System Control Table 25 to obtain the version/release number of the stored procedure, and then parses according to rules in effect for the obtained version/release number of the stored procedure, in other words, it parses only what is known to the stored procedure.

The exemplary BLOB 20 shown in the figure comprises a first data element ID 26, a first data type 28, a first data length 30, a second data element ID 32, a second data type 34 and a second data length 36. These describe, respectively, a first character data value 38 and a second character data value 40 that form the exemplary CLOB 22. The illustrated BLOB/CLOB pair 20/22 is for exemplary purposes only, and the BLOB 20 may define any number of data elements, by means of any suitable coding method, not limited by the example illustrated. The CLOB 22, likewise, may define any number of data values.

Provision is made for the case where the parsing component, either a calling API 12 program or a receiving stored procedure 14 program, is an earlier version/release than the other. In exemplary embodiments, a common parse routine 42 automatically skips data elements which the receiving API or stored procedure is not expecting, and searches ahead in the data structure for the next tuple (data element and data value) which matches what the parsing component (API or stored procedure) expects or knows about. This technique avoids the necessity of incorporating this logic in every stored procedure and API. In the exemplary BLOB/CLOB pair 20/22 for example, data element #1 26-30, 38 was incorporated in an early version of a CMS, and data element #2 32-36, 40 was incorporated into a later version of the CMS, so that data element #2 would be unknown to implementations of the early version of the CMS and the respective APIs.

Special consideration is given, as well, to the scenarios where either of the APIs or stored procedures are at an early version level that does not incorporate concepts of the present invention. The early code may be generally available, and it is thus a goal to not require a change to every API and stored procedure in order to add version/release information to every BLOB/CLOB pair in those instances where they have not changed. The absence of the version/release information at the start of the BLOB/CLOB pair will serve as an indication that the component is at an early version/release level not incorporating concepts of the present invention.

Although the preferred embodiments disclosed herein describe a numerical comparison of version/release numbers, the invention also includes the case wherein the version/release numbers of the APIs and the version/release numbers of the respective stored procedures are not numbered according to the same schedule or scheme. For example, it may be the case that a version 5.0 API is compatible with version 10.0 stored procedures, or vice versa. In this case, rather than simply comparing version/release numbers numerically, embodiments of the present invention determine compatibility by mapping API version/release numbers to compatible, or incompatible, stored procedure version release numbers. This is accomplished by various methods known in the art, such as, for instance, a system version mapping table. This also proves beneficial in the case where an older version release of an API is compatible with a newer version/release of the stored procedures, and vice versa.

Figure 3:
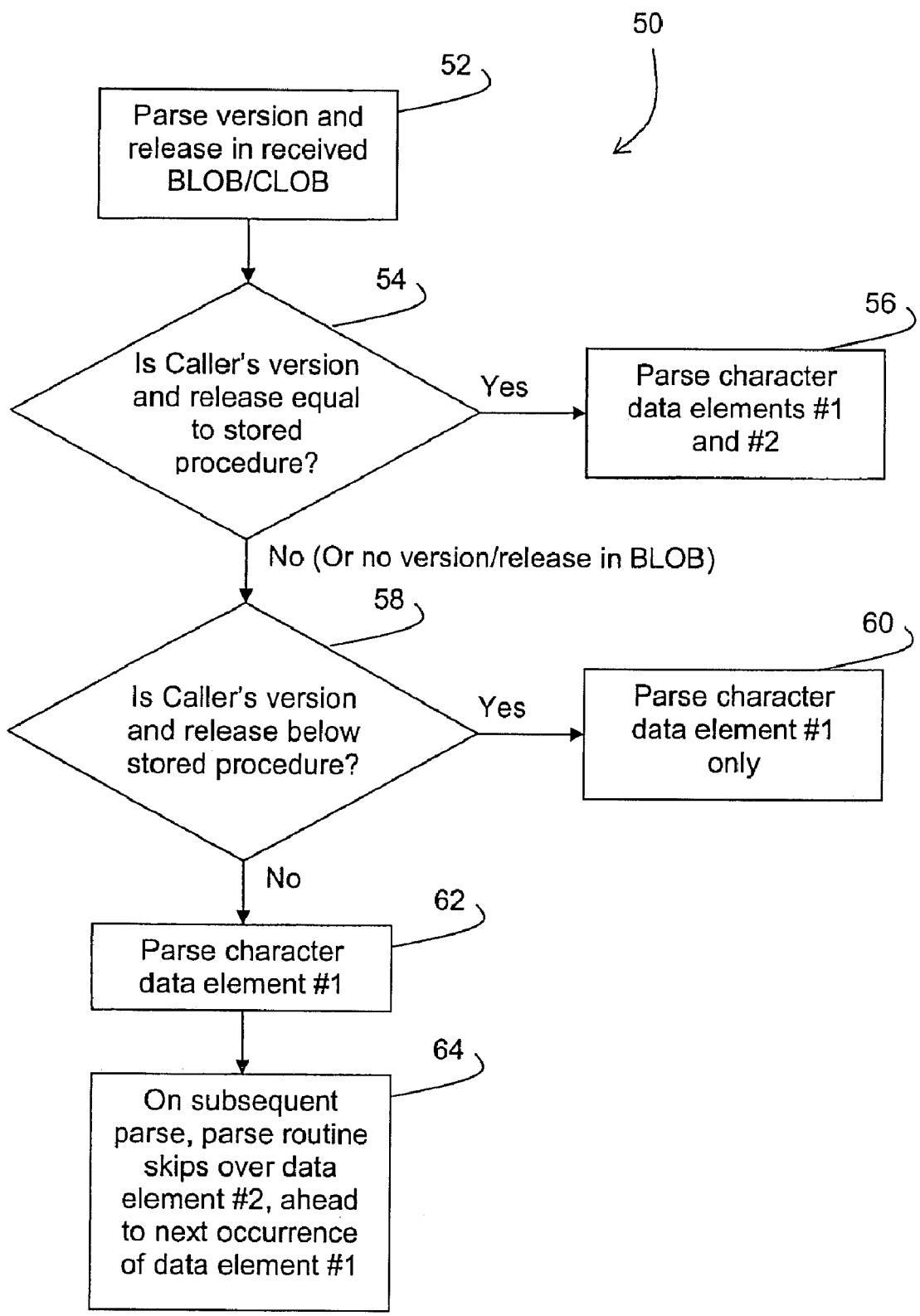
FIG. 3 is a flowchart of a method according to the present invention.

With reference now to FIG. 3, a method 50 for parameter passing of data structures is described that is sufficient to cover two scenarios, a first where the API is at a lower version/release than the stored procedures, and a second where the API is at a higher version/release than the stored procedures. In describing the method, reference is made to a caller, where the caller is one of the API of the user application or the CMS. In a first step 52, the received BLOB/CLOB pair is parsed to ascertain the version and release information, or absence of same, of the caller. A first comparison 54 is performed to determine if the caller's version and release is identical to that of the stored procedure. If the comparison is true, the version and release information matches, then parsing of character data elements known to both the caller and the stored procedure occurs at step 56. In the example of FIG. 2, character data elements #1 and #2 are parsed.

In the case where the comparison 54 is not true, the version and release do not match, or there is no version/release information present in the received BLOB, a determination 58 is made as to whether or not the caller's version and release is lower (earlier) than that of the stored procedure. If the caller's version/release is lower, or absent, processing continues at step 60 where only the character data elements known to the caller are parsed. In the example, only character data element #1 is parsed. This avoids errors that would occur if the stored procedure would expect additional data elements not known to the caller which is at an earlier version/release than the stored procedure.

If the caller's version/release is at a higher value (later) than that of the stored procedure, only character data elements known to the stored procedure are parsed. At step 62 a character data element known to the stored procedure is parsed, character data element #1 in the example. On a subsequent parse at step 64, character data elements unknown to the stored procedure are skipped, down to the next occurrence of a character data element known to the stored procedure. In the example, character data element #2 is skipped to the next occurrence of character data element #1.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

The invention claimed is:

1. A system for passing parameters of data structures on a computer system wherein APIs and corresponding stored procedures are of version/release levels different from one another, the system comprising: means for receiving, from a calling program, a data structure including at least one data structure element; means for parsing the data structure for a first version identifier of the data structure; means for comparing the first version identifier to a second version identifier of the stored procedures and determining one of a data structure compatibility or a data structure incompatibility between said calling program and said stored procedures as a result of said comparing and obtaining version control information from a library, and thereafter parsing data structure elements in accordance to an indication of data structure compatibility; means for parsing all of the data structure elements of the data structure known to both of the calling program and the stored procedures when said comparing means determines a data structure compatibility between said calling program and said stored procedures; and means for parsing only the data structure elements of the data structure that are known to both of said calling program and said stored procedures when said comparing means determines a data structure incompatibility between said calling program and said stored procedures.

2. The system for passing parameters of data structures as set forth in claim 1, wherein said comparing means determines a data structure incompatibility between said calling program and said stored procedures when the first version identifier is absent.

3. The system for passing parameters of data structures as set forth in claim 1, wherein said comparing means determines a data structure compatibility between said calling program and said stored procedures when the first version identifier matches the second version identifier.

4. The system for passing parameters of data structures as set forth in claim 1, wherein said comparing means determines at least one of: a data structure incompatibility between said calling program and said stored procedures when the first version identifier is determined to be less than the second version identifier or missing; and a data structure incompatibility between said calling program and said stored procedures when the first version identifier is determined to be greater than the second version identifier.

5. The system for passing parameters of data structures as set forth in claim 4, wherein said parsing means parses only the data structure elements of the data structure that are known to the calling program when the first version identifier is less than the second version identifier or missing.

6. The system for passing parameters of data structures as set forth in claim 4, wherein said parsing means parses only the data structure elements of the data structure that are known to the stored procedures when the first version identifier is greater than the second version identifier.

7. The system for passing parameters of data structures as set forth in claim 1, wherein the data structure includes a BLOB/CLOB pair.

8. The system for passing parameters of data structures as set forth in claim 7, wherein: the CLOB includes at least one character data value; and the BLOB includes: a version identifier; a data element ID for each respective character data value; a data type for each respective character data value; and a data length for each respective character data value.

9. The system for passing parameters of data structures as set forth in claim 8, wherein the version identifier includes: a version number; and a release number.

10. A non-transitory computer program product comprising a computer usable medium having computer readable program code means embodied in said medium for use in passing parameters of data structures on a computer system wherein APIs and corresponding stored procedures are at different version/release levels, comprising: program code for receiving, from a calling program, a data structure including at least one data structure element; program code for parsing the data structure for a first version identifier of the data structure; program code for comparing the first version identifier to a second version identifier of the stored procedures and determining one of a data structure compatibility or a data structure incompatibility between said calling program and said stored procedures as a result of said comparing and obtaining version control information from a library, and thereafter parsing data structure elements in accordance to an indication of data structure compatibility, wherein; program code for parsing all of the data structure elements of the data structure known to both of the calling program and the stored procedures when said comparing program code determines a data structure compatibility between said calling program and said stored procedures; and program code for parsing only the data structure elements of the data structure that are known to both of said calling program and said stored procedures when said comparing program code determines a data structure incompatibility between said calling program and said stored procedures.

11. The non-transitory computer program product as set forth in claim 10, wherein said comparing program code determines a data structure incompatibility between said calling program and said stored procedures when the first version identifier is absent.

12. The non-transitory computer program product as set forth in claim 10, wherein said comparing program code determines a data structure compatibility between said calling program and said stored procedures when the first version identifier matches the second version identifier.

13. The non-transitory computer program product as set forth in claim 10, wherein said comparing program code determines at least one of: a data structure incompatibility between said calling program and said stored procedures when the first version identifier is determined to be less than the second version identifier or missing; and a data structure incompatibility between said calling program and said stored procedures when the first version identifier is determined to be greater than the second version identifier.

14. The non-transitory computer program product as set forth in claim 13, wherein said parsing program code parses only the data structure elements of the data structure that are known to the calling program when the first version identifier is less than the second version identifier or missing.

15. The non-transitory computer program product as set forth in claim 13, wherein said parsing program code parses only the data structure elements of the data structure that are known to the stored procedures when the first version identifier is greater than the second version identifier.

16. The non-transitory computer program product as set forth in claim 10, wherein the data structure includes a BLOB/CLOB pair.

17. The non-transitory computer program product as set forth in claim 16, wherein: the CLOB includes at least one character data value; and the BLOB includes: a version identifier; a data element ID for each respective character data value; a data type for each respective character data value; and a data length for each respective character data value.

18. The non-transitory computer program product as set forth in claim 17, wherein the version identifier includes: a version number; and a release number.

\* \* \* \* \*